United States Patent Office 3,669,686
Patented June 13, 1972

3,669,686
METHOD OF HEAT TEMPERING POTATOES PRIOR TO FURTHER PROCESSING
Thomas J. Schoch, Ithaca, N.Y., and Jerry L. Sloan, Beaverton, Oreg., assignors to Lamb-Weston, Inc., Portland, Oreg.
No Drawing. Filed July 22, 1969, Ser. No. 843,737
Int. Cl. A23l 1/12
U.S. Cl. 99—103                                                    1 Claim

ABSTRACT OF THE DISCLOSURE

A process of pretreating potatoes prior to further processing in which whole unpeeled potato tubers or peeled potato pieces are heated to an internal temperature of between about 122° F. and 140° F. for a period of between about 3 and 24 hours to increase the association of the starch molecules in the starch granules without gelatinization of the starch. The process produces a firm potato tissue which resists physical breakdown during further processing.

---

This invention relates to a heat tempering method of pretreating whole unpeeled potatoes or peeled potato pieces prior to further processing. The heat tempering process produces changes in the potato tissue which result in a finished product of desirable physical characteristics as related to texture. Processed potatoes pretreated according to the present invention prior to further processing yield a final product which resists physical breakdown during further preparation by thermal processing or cooking.

The process of the present invention treats whole unpeeled potatoes or peeled potato pieces at an elevated temperature below the starch gelatinization temperature to increase the association of the starch molecules in the starch granules without gelatinization of the starch.

More specifically, the invention comprises heat tempering whole unpeeled potato tubers by heating them to an internal temperature of between about 122° F. and 140° F. in a hot water, hot air, or a partially or completely water saturated hot air medium and maintaining this temperature for a period of between about 3 and 24 hours. Peeled potato pieces may be so treated by heating them in a hot water or water saturated hot air medium, but not in hot air.

The length of the holding period in the medium is determined by the degree of firmness desired in the processed potato product. Generally, the longer the period of heating, the firmer is the resulting product.

The process of the present invention increases association of the starch molecules in the starch granules without gelatinization of the starch. Such produces a firm potato tissue which resists physical breakdown during the further processing. The resulting product is a potato which yields processed potato products of desirable texture.

The process of the present invention also contemplates the application of sodium bisulfite in a solution, fog or gaseous $SO_2$ form to the exterior potato surface during the heat tempering process in order to retard discoloration of the potato tissue.

The process of the present invention also contemplates the heat tempering of potato tubers or potato pieces in a stepwise process by raising the temperature of the heating medium between about one and five degrees F. per hour over a temperature range from about 122° F. to a temperature below the initiation of gelatinization. Specifically, the process comprises introducing the potatoes into a fluid medium having an initial temperature of 122° F. and stepwise increasing the medium temperature one to five degrees F. per hour, but maintaining an internal potato temperature five degrees F. below the initiation of gelatinization as determined with a Kofler hot stage and a polarizing microscope. It is assumed, of course, that precise temperature control is possible with no hot spots within the treating medium. The initiation of gelatinization is indicated by a loss of the polarization crosses of the starch granule. The polarization crosses are characteristic of ungelatinized potato starch granules. The mode and rate of temperature increments may have to be determined specifically for each potato variety by those skilled in the art with a Kofler hot stage and a polarizing microscope in order to allow for the wide variation in the gelatinization temperature ranges of potato starch from potatoes from various regions of the country. The potato starch gelatinization temperature generally increases during the heat tempering treatment.

The process of the present invention yields benefits to further processed potato products. Potato products derived from the heat tempered potatoes of the present invention have a firmer texture which is resistant to sloughing during further heat processing or cooking. The tissue of the heated potatoes cuts more easily and leaves a very smooth surface. The heat tempered potato pieces are also less fragile and retain their physical identity more readily during further processing.

The process of the present invention appears to add enough thermal energy to facilitate association of starch molecules within the starch granules. The temperature, however, is below the gelatinization temperature and does not cause cell rupturing.

EXAMPLE 1

Raw, unpeeled, russet Burbank potato tubers were placed in a constant temperature water bath maintained at 136° F. and containing a weak aqueous solution of sodium bisulfite. The tubers were heat tempered in the hot water, with individual potatoes being withdrawn at intervals during a period of from three to ten hours. As the potatoes were removed from the water bath, they were peeled and immediately placed in an aqueous sodium bisulfite solution. The potatoes were then cut into appropriate sizes and further processed according to the method of dehydrating food products disclosed in Kruger Pat. No. 3,438,792. The finally resulting product was much firmer in texture upon rehydration and boiling in hot water. The product also retained the texture of an undercooked potato in relation to controlled products produced from potatoes which were not heat tempered according to the process of the present invention. A comparison of pieces according to the time spent in the water bath indicated that the longer the period of heating, the firmer was the resulting product.

EXAMPLE 2

Potatoes as in Example 1 were placed over a hot air stream maintained at 130° F. Samples were withdrawn at intervals during a period of from five to ten hours in the hot air stream. During the period in the medium, the internal temperature of the potatoes reached the temperature of the air stream. The potatoes upon being removed from the air stream were then processed as in Example 1. The resulting potato products exhibited an increase in firmness of texture due to the heat tempering as compared with products made with potatoes not treated according to the method of the present invenion. The treated potato product was also more resistant to sloughing during further heat processing and cooking.

EXAMPLE 3

Whole unpeeled potato tubers were suspended over a body of hot water in a steam pressure vessel. Sufficient steam was injected into the water to produce a saturated hot air atmosphere of between 122 and 140° F. surrounding the potato tubers. After a heat tempering treatment of 10 hours with sodium bisulfite solution rinses every two hours, the potatoes were removed, peeled and processed as in Example 1. The resulting product produced a potato piece which remained firm when cooked and had the texture of a partially raw potato piece compared to products from potatoes not treated according to the process of the present invention.

EXAMPLE 4

Whole potato tubers and peeled potato pieces were submerged in water at 125° F. for 24 hours, and at 130° F. for 8 hours, respectively. After being removed from the water the pieces were found to be very resistant to further boiling. They did not break down after attenuated heating in boiling water.

We claim:

1. A process for treating potatoes which comprises introducing said potatoes while in the raw state and prior to further processing into a fluid medium having an initial temperature of about 122 degrees F. and increasing the temperature of said medium at a rate of between about one degree and five degrees F. per hour until the temperature of said medium reaches about five degrees F. below the initiation of starch gelatinization in the potatoes, and thereafter removing said potatoes from said medium.

References Cited
UNITED STATES PATENTS

| | | | |
|---|---|---|---|
| 2,787,553 | 4/1957 | Cording et al. | 99—207 |
| 2,797,166 | 6/1957 | Siciliano et al. | 99—100 R |
| 2,762,709 | 9/1956 | Janis et al. | 99—100 P |
| 3,012,897 | 12/1961 | Sullvian et al. | 99—207 |
| 3,343,970 | 9/1967 | Pader et al. | 99—100 P |
| 3,394,010 | 7/1968 | Miller | 99—207 X |
| 3,438,792 | 4/1969 | Kruger | 99—199 |
| 3,495,994 | 2/1970 | Kwiat et al. | 99—207 |

OTHER REFERENCES

Advances in Food Research, vol. 6 (1955), Olson et al. (Potato Granules Mfg.) pp. 241–247.

NORMAN YUDKOFF, Primary Examiner

M. G. MULLEN, Assistant Examiner

U.S. Cl. X.R.

99—100 P, 207